US012572875B2

(12) United States Patent
Jha et al.

(10) Patent No.: US 12,572,875 B2
(45) Date of Patent: Mar. 10, 2026

(54) METHOD AND SYSTEM FOR MANAGING AN ORGANIZATION'S PERFORMANCE

(71) Applicant: Dell Products L.P., Round Rock, TX (US)

(72) Inventors: Saurabh Jha, Austin, TX (US); Priyanka Pathak, Hyderabad (IN); Kuruba Ajay Kumar, Anantapur (IN)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/732,120

(22) Filed: Jun. 3, 2024

(65) Prior Publication Data

US 2025/0371478 A1 Dec. 4, 2025

(51) Int. Cl.
*G06Q 10/0639* (2023.01)

(52) U.S. Cl.
CPC .............................. *G06Q 10/06393* (2013.01)

(58) Field of Classification Search
None
See application file for complete search history.

(56) References Cited

U.S. PATENT DOCUMENTS

2011/0251977 A1 * 10/2011 Cialowicz ............. G06F 16/313
705/342

OTHER PUBLICATIONS

Medya, Sourav, et al. "An exploratory study of stock price movements from earnings calls." Companion proceedings of the web conference 2022. 2022. (Year: 2022).*
Li, Feng. "The information content of forward-looking statements in corporate filings—A naïve Bayesian machine learning approach." Journal of accounting research 48.5 (2010): 1049-1102. (Year: 2010).*

* cited by examiner

*Primary Examiner* — Emmett K. Walsh
(74) *Attorney, Agent, or Firm* — Chamberlain, Hrdlicka, White, Williams & Aughtry; Aly Z. Dossa

(57) ABSTRACT

A method for managing an organization's performance includes: receiving an adjacency matrix (AM) from a document attention module; determining, by employing a first model, a first k-hop value for a first transcript and a second k-hop value for a second transcript based on the AM; analyzing the first k-hop value, the second k-hop value, and the AM; generating, by employing a second model, a second graph representation based on relationships in the AM; transforming the second graph representation into embedding vectors (EVs); analyzing, by employing a language model, the EVs to extract features; analyzing the features to generate a first sentiment score (SS) for a first sentence of the first transcript and a second SS for a second sentence of the first transcript; and classifying the first sentence as a first negative sentence and the second sentence as a second negative sentence.

20 Claims, 7 Drawing Sheets

System 100

Infrastructure Node (IN) 120

Database 135

Network 130

Client A 110A

Client N 110N

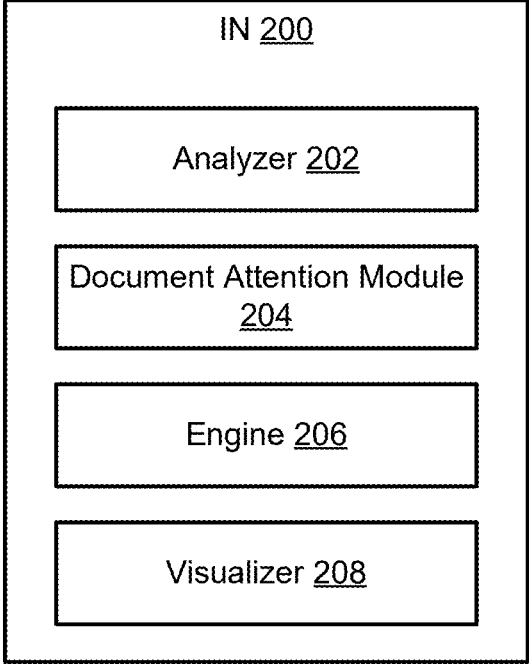
FIG. 2.1

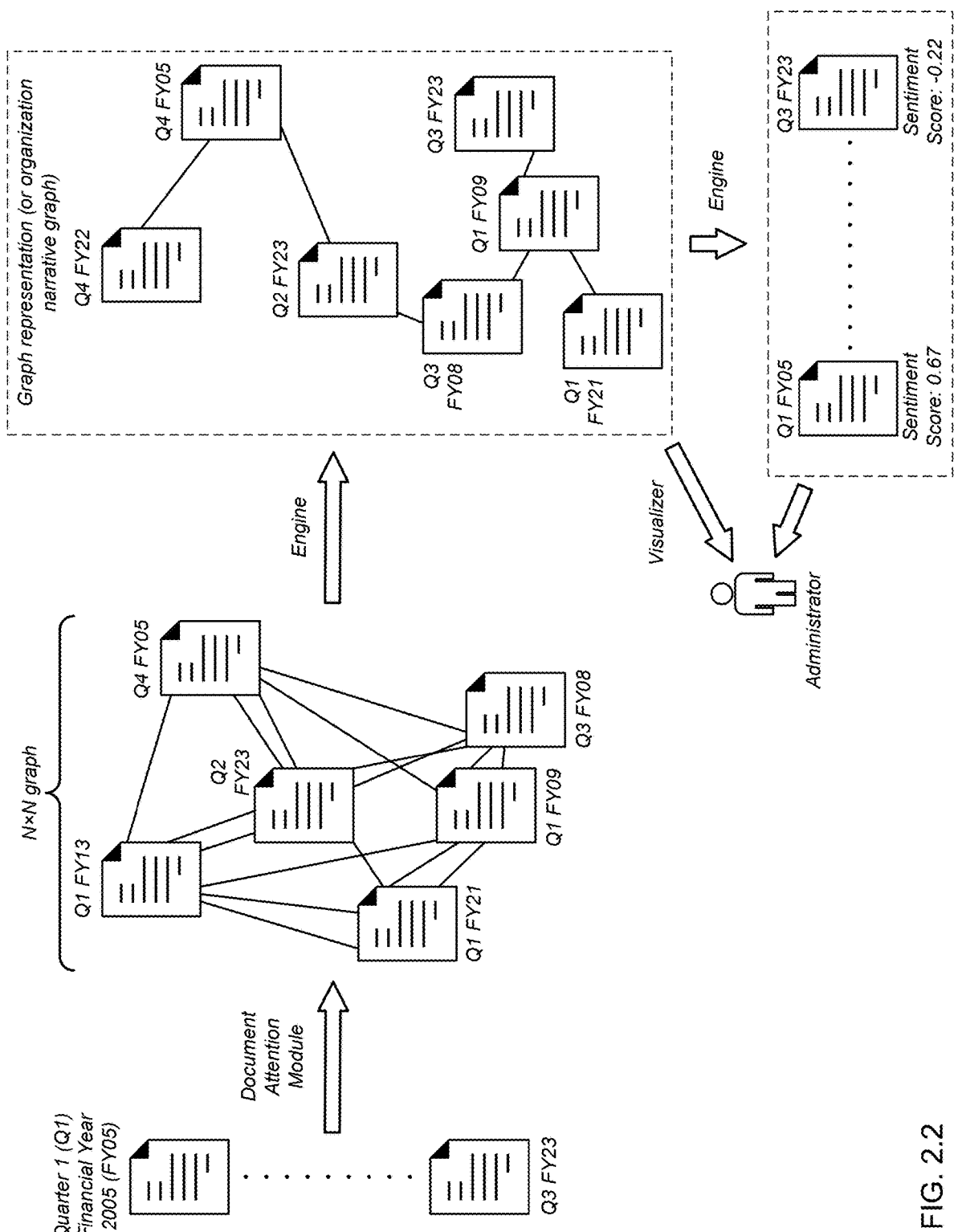
FIG. 2.2

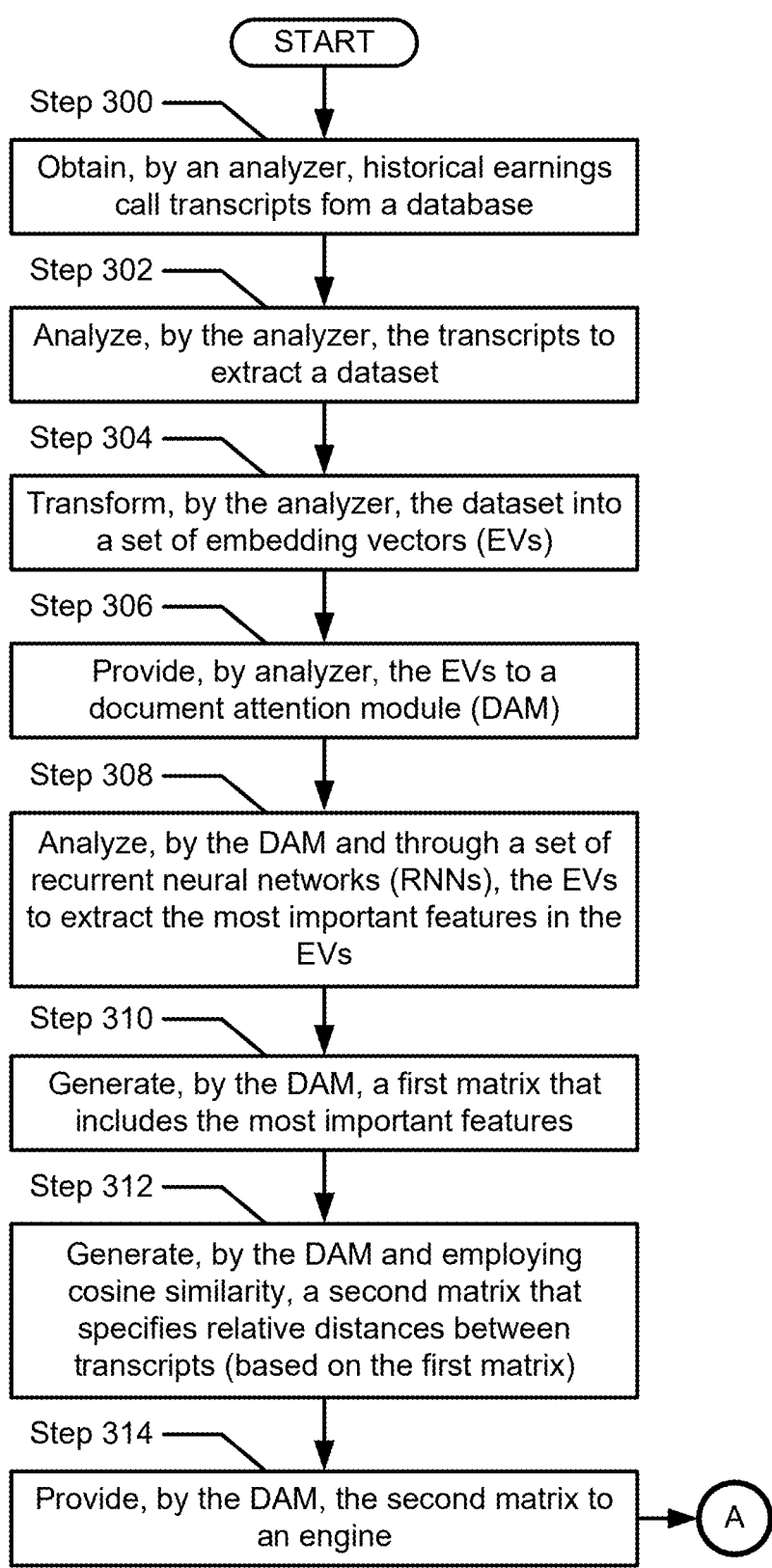
FIG. 3.1

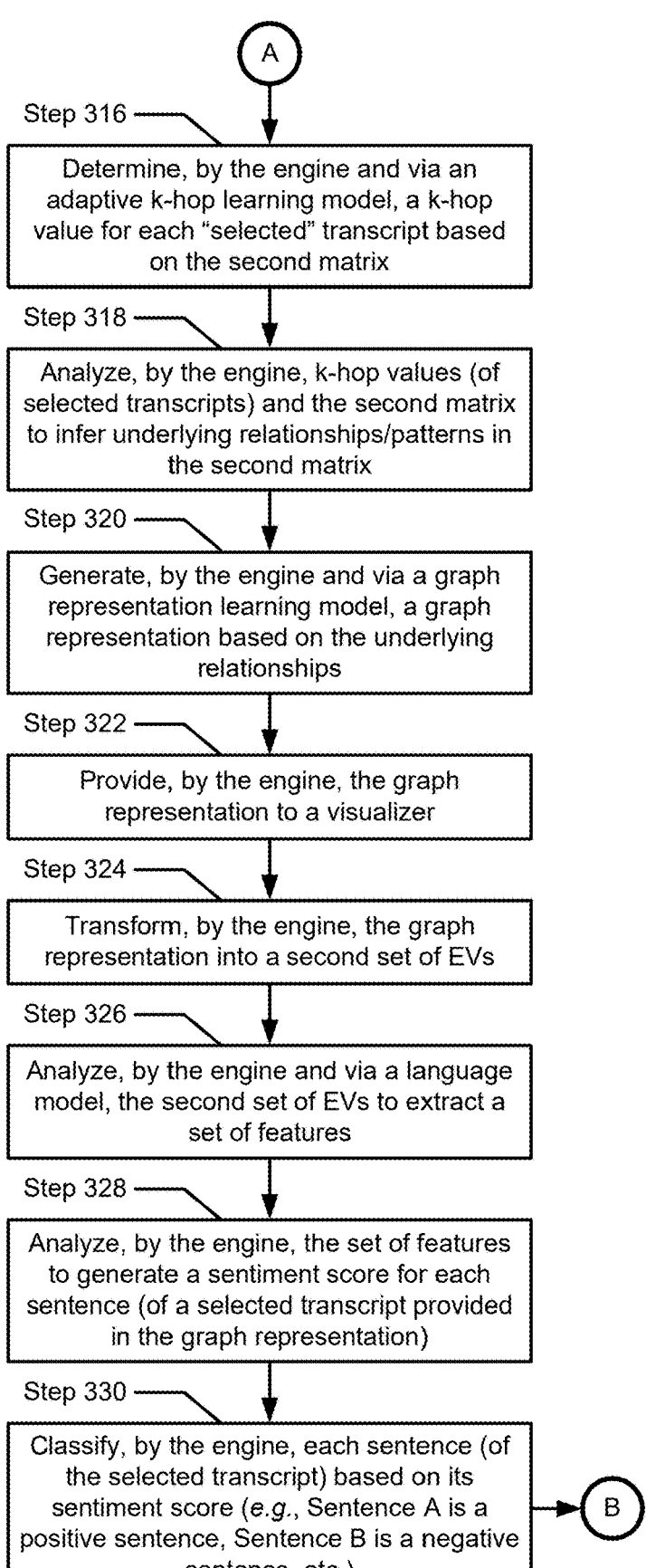
FIG. 3.2

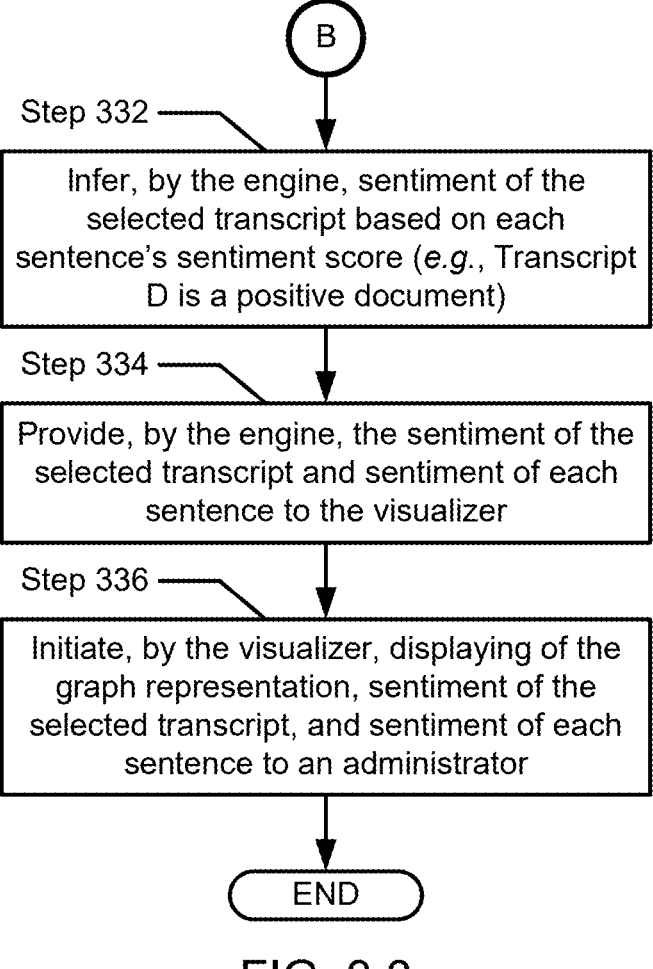

Step 332

Infer, by the engine, sentiment of the selected transcript based on each sentence's sentiment score (*e.g.*, Transcript D is a positive document)

Step 334

Provide, by the engine, the sentiment of the selected transcript and sentiment of each sentence to the visualizer Step 336

Initiate, by the visualizer, displaying of the graph representation, sentiment of the selected transcript, and sentiment of each sentence to an administrator

END

FIG. 3.3

METHOD AND SYSTEM FOR MANAGING AN ORGANIZATION'S PERFORMANCE

BACKGROUND

Earnings conference calls are typically held by publicly traded organizations to discuss their financial results with investors, analysts, and the media. During these calls, organization executives provide an overview of the organization's financial performance, highlight key accomplishments, and discuss any factors that may have affected any said financial results. Earnings conference calls thus provide a forum for organizations to communicate directly with their investors and other stakeholders about their financial performance and outlook.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 2.1 shows a diagram of an infrastructure node in accordance with one or more embodiments disclosed herein.

FIG. 2.2 shows an example use case in which a representation that narrates the financial performance of an organization is provided to an entity in accordance with one or more embodiments disclosed herein.

FIGS. 3.1-3.3 show a method for managing financial performance of the organization in accordance with one or more embodiments disclosed herein.

DETAILED DESCRIPTION

Figure 1:
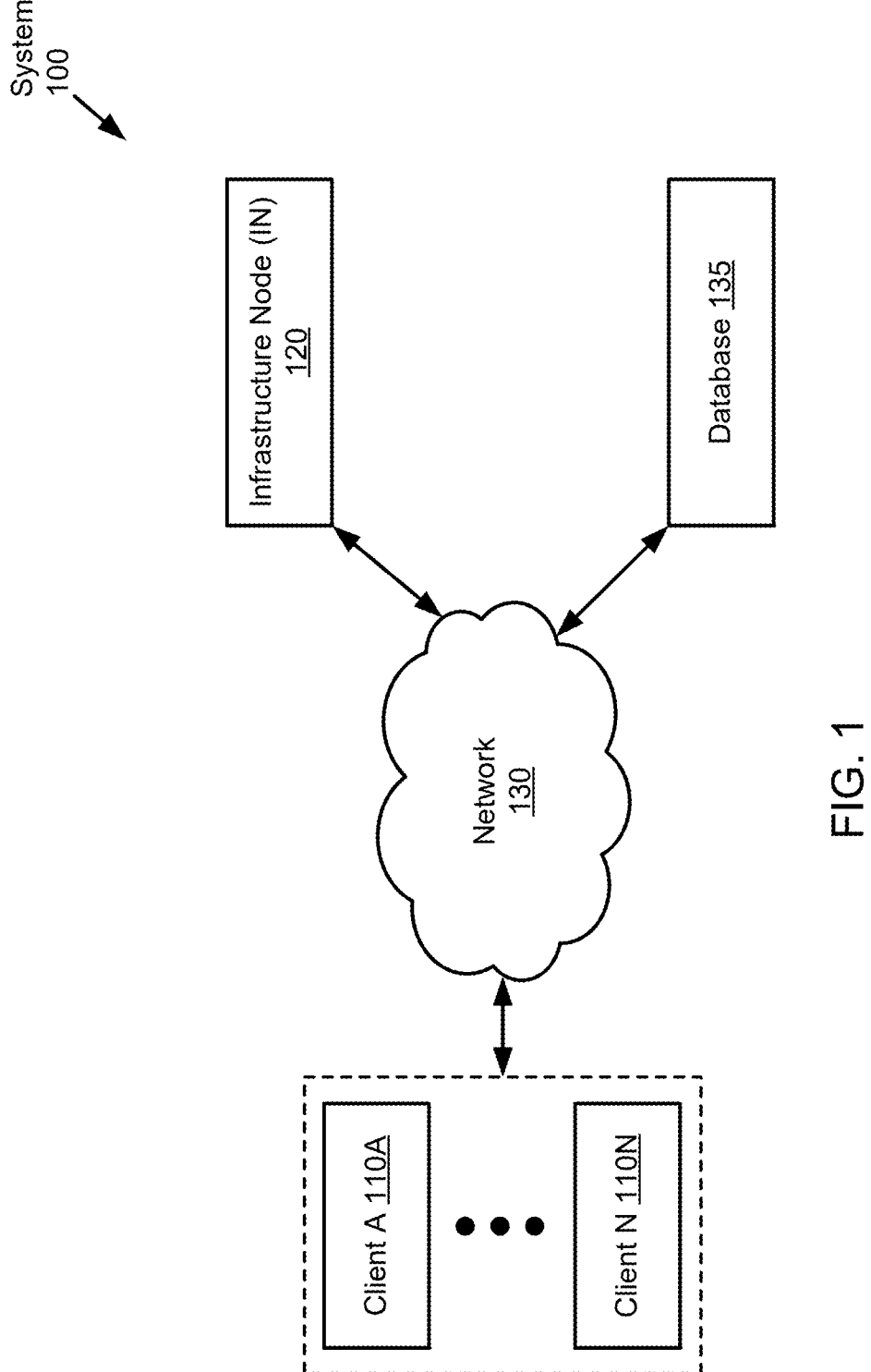
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, organizations are in a state of constant change. Identifying patterns in organizational performance may enrich the context in which individuals (e.g., business leaders, organization executives, etc.) make decisions. For example, leaders may be able to identify trends and/or patterns in an organization's financial performance over time, which may provide valuable insights into the factors that have contributed to the organization's successes and/or challenges in the past. This may help leaders' decision-making and strategic planning moving forward (e.g., identifying potential risks or opportunities for the organization).

In most cases, leaders may use a combination of hard data and soft data. For context, hard data is typically "technology-generated" and may include quantitative metrics (which usually listed in reports). Soft data, on the other hand, is typically gathered using qualitative analyses and it is a common practice for leaders to use soft data (e.g., customer feedback, supplier dealings, polls, earnings conference call transcripts, etc.) to generate a narrative around hard data (e.g., financial or operational metrics).

As used herein, earnings conference calls (or earnings calls) are typically held by publicly traded organizations to discuss their financial results with investors, analysts, and the media. During these calls, organization executives provide an overview of the organization's financial performance, highlight key accomplishments, and discuss any factors that may have affected any said financial results. Earnings conference calls thus provide a forum for organizations to communicate directly with their investors and other stakeholders about their financial performance and outlook. As such, earnings conference calls may help to improve transparency and build trust with investors, which can in turn support the organization's stock price and overall financial health.

Furthermore, earnings conference calls are often conducted following the release of earnings results for an organization, which traditionally occurs on a quarterly basis; however, said occurrence may ultimately depend on the organization's financial reporting schedule. Earnings conference calls may include, for example (but not limited to): an opening statement from an organization representative, a presentation of the organization's financial results, a questions-and-answers (Q&A) session with analysts and investors, etc. Further, earnings conference calls may be open to the public and are available via various communication mediums.

A pain point for an organization in understanding how their conveyance of any investor relations (IR) communication (e.g., earnings conference calls) will be interpreted by analysts and investors is the potential for misunderstandings or misinterpretations. Even if an organization presents information clearly and accurately, there is always a risk that said information may be misunderstood or taken out of context by analysts and investors. Additionally, the language and terminology used during earnings conference calls may be technical and difficult for those without a financial background to comprehend. For this reason, it may be challenging for the organization to ensure that their message is being understood properly by all stakeholders. Separately, the overall sentiment and market reaction to an organization's earnings may be difficult to predict, whereas the organization may not always be able to anticipate how their IR communication will be received by analysts and investors.

From a different perspective, an IR team may face challenges when analyzing earnings conference call transcripts for insights. One major challenge may be the quality of data (included in the transcripts), in which cleaning and/or pre-processing low quality data (e.g., data that includes inconsistent formatting, missing data, and/or incorrect data) may require significant effort (e.g., time, computing resources, etc.). Another challenge may be the presence of noise in the transcripts, including irrelevant information or biased statements (e.g., of analysts) towards the financial health/performance of the organization.

To address these challenges, the IR team may need to invest in advanced natural language processing (NLP) techniques (e.g., named entity recognition techniques, information extraction techniques, etc.) to structure the data and extract meaningful insights. Additionally, there may be some limitations in terms of financial data and computing resource availability, which may force the team to prioritize their analyses and invest more in computing resources. As discussed above, a lack of technical expertise may also be an issue, which may require the team to hire external experts or invest in specialized tools.

Further, while there are many tools (e.g., simulation programs) to effectively distill/analyze/process hard data, there are limited tools to systematically analyze soft data. This may result in findings that are often anecdotal or myopic, which introduces bias into decision-making. Moreover, having a systematic approach to analyze soft data may ensure that feedback (e.g., from analysts) is collected in a consistent way, making it easier to identify patterns and trends (of those analysts) over time, rather than getting lost in the noise of ad-hoc or unstructured information. This may help leaders to (i) identify trends and patterns that may not be immediately apparent and (ii) make more informed and data-driven decisions, which may lead improving performance and competitiveness of the organization.

Another key challenge for leaders is deriving actionable insights in a dynamic environment (e.g., an environment where it is hard to predict what an analyst is going to ask during a call). Because of that, leaders may not have the luxury of analyzing economic variables ceteris paribus and insights into how business dynamics interact with each other may help the leaders better respond to changing business environments and make more informed decisions.

For at least the reasons discussed above and without requiring resource-intensive efforts (e.g., time, engineering, etc.), a fundamentally different approach/framework is needed (e.g., a framework to build a simple graph representation that narrates financial performance of an organization, where the framework can be used by leaders (of that organization) to better understand the health of the organization in the context of its history and the macro-environment towards making more informed decisions (e.g., questions that may be asked by Analyst A during the call, how to approach Analyst B during the call, what to expect from Analyst T during the call, etc.)).

Embodiments disclosed herein relate to methods and systems for managing financial performance of an organization. As a result of the processes discussed below, one or more embodiments disclosed herein advantageously ensure that: (i) an end-to-end learning architecture (e.g., the framework) that classifies the sentiments of earnings conference calls (by using graph representations of earnings conference call transcripts) is provided to users (e.g., leaders); (ii) at least earnings conference call transcripts are used to enhance IR communication because these calls are a standard forum where leaders communicate with investors and/or analysts regarding the financial performance of the organization; (iii) sentiments expressed within certain sections of earnings conference call transcripts are assessed so that (a) valuable insights into the overall sentiment reflective of the organization and the financial performance thereof are provided to the leaders, (b) the leaders are allowed to identify and focus on any potential areas of concern, and (c) the leaders can take steps to address any negative sentiment that may be involuntarily conveyed during (where any said taken steps may clarify their financial position proceeding) any earnings conference call; (iv) insights into how business dynamics confound and interact with each other are provided to the leaders so that they better respond to changing business environments and make more informed business decisions (e.g., by removing bias from decision-making); (v) hidden representations both within and between earnings conference call transcripts are uncovered (e.g., Analyst A provided negative feedback (regarding the organization's performance) during the call, Analyst T was neutral during the call, Analyst B asked performance related questions, Analyst R made a recommendation during the call, etc.), in which these representations are used as a guide to provide a financial narrative of the organization through time; (vi) a comprehensive and real-time understanding of sentiment (e.g., investor sentiment, analyst sentiment, etc.) is provided, which may help the leaders in aligning communication and messaging effectively (e.g., based on Investor A's negative impression, Leader R can modify his/her speech in real-time (or in near real-time) during the call); and/or (vii) IR teams can build simple graph representations that illustrate organization's performance and sentiment of different individuals using earnings conference call transcripts.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (IN) (e.g., 120), and a database (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (120), the network (130), and the database (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 400, FIG. 4) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 400, FIG. 4) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or computing device operated by one or more individuals of (or employed by) an organization. Examples of said individual(s) may include, but not limited to, any organization executive(s) (e.g., chief executive officer (CEO), chief financial officer (CFO), vice president (VP) of IR, etc.), and any employee(s) in the IR department/team of the organization (e.g., an IR expert). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 4:
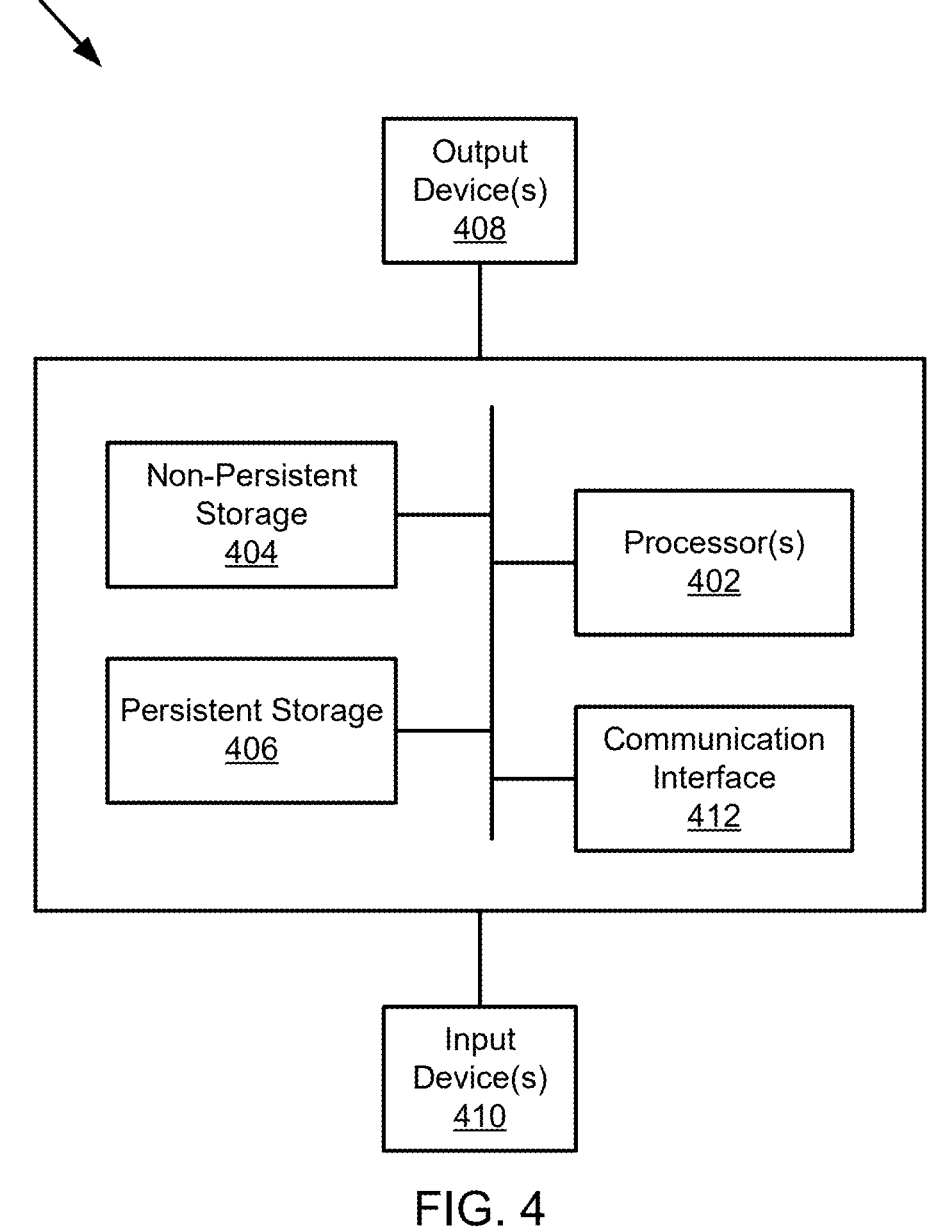
FIG. 4 shows a diagram of a computing device in accordance with one or more embodiments disclosed herein.

Further, in one or more embodiments, a client (e.g., 110A, 110N, etc.) may be implemented as a computing device (e.g., 400, FIG. 4). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 400, FIG. 4) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may represent any enterprise information technology (IT) infrastructure at least configured to improve the underlying sentiment at a sentence level, as well as at a document level, expressed within an earnings call transcript drafted for any pending (or yet to be conducted) earnings conference call(s) by representatives (e.g., leaders) of an organization. By improving the sentimentality of the earnings call transcript, and thus of a pending earnings conference call by association, any disclosed content may be conveyed in a better manner that can prompt favorable market reactions, while mitigating unfavorable market reactions, applicable to the organization's stock by investors, analysts, and other stakeholders.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the database (135) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the database (135); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); (xxv) manage operations of one or more clients (e.g., receiving information from the clients regarding changes in the operation of the clients) to improve their operations (e.g., improve the quality of data being generated, decrease the computing resources cost of generating data, etc.); and/or (xxvi) perform sentiment based IR communication enhancement. In one or more embodiments, in order to read, write, or store data, the IN (120) may communicate with, for example, the database (135) and/or other storage devices in the system (100).

As described above, the IN (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (120) may perform other functionalities without departing from the scope of the embodiments disclosed herein. In one or more embodiments, the IN may be configured to perform (in conjunction with the database (135)) all, or a portion, of the functionalities described in FIGS. 3.1-3.3.

In one or more embodiments, the IN (120) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (120) may also be implemented as a logical device.

In one or more embodiments, the IN (120) may host an analyzer (e.g., 202, FIG. 2.1), a document attention module (e.g., 204, FIG. 2.1), an engine (e.g., 206, FIG. 2.1), and a visualizer (e.g., 208, FIG. 2.1). Additional details of the analyzer, document attention module, engine, and visualizer are described below in reference to FIG. 2.1. In the embodiments of the present disclosure, the database (135) is demonstrated as a separate entity from the IN (120); however, embodiments disclosed herein are not limited as such. The database (135) may be demonstrated as a part of the IN (e.g., as deployed to the IN).

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database (135) may also occupy a portion of a physical storage/memory device or, alternatively, may span across multiple physical storage/memory devices.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (135) may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A)); a protocol type associated with a port number; computing resource details (including details of hardware components and/or software components) and an IP address of an IN (e.g., 120) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to the IN (120)); one or more points-in-time and/or one or more periods of time associated with a data recovery event; data for execution of applications/ services (including IN applications and associated endpoints); corpuses of annotated data used to build/generate and train processing classifiers for trained ML models; linear, non-linear, and/or ML model parameters (e.g., instructions to the engine (e.g., 206, FIG. 2.1) on how to train and/or fine-tune a model); an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN (e.g., 120); a size of each of the set of assets protected; a number of each type of a set of data protection policies implemented by a user; configuration information associated with the analyzer (e.g., 202, FIG. 2.1) (to manage security, network traffic, network access, or any other function/operation performed by the analyzer); configuration information associated with the engine (e.g., 206, FIG. 2.1) (to manage security, network traffic, network access, or any other function/operation performed by the engine); a job detail of a job (e.g., a data protection job, a data restoration job, a log retention job, etc.) that has been initiated by an IN (e.g., 120); a type of the job (e.g., a non-parallel processing job, a parallel processing job, an analytics job, etc.); information associated with a hardware resource set (discussed below) of the IN (120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the analyzer; a number of errors encountered when handling a job; a documentation that shows how the analyzer performs against an SLO and/or an SLA; information regarding an administrator (e.g., a high priority trusted administrator, a low priority trusted administrator, etc.) related to an analytics job; a workflow (e.g., a policy that dictates how a workload should be configured and/or protected, such as an SQL workflow dictates how a structured query language (SQL) workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/ customer experience; earnings call transcripts (or "historical" earnings call transcripts); earnings statements (or "historical" earnings transcripts); earnings call reactions; market metrics; sentence sentiments; transcript sentiments; raw data associated with a discussion to be processed (where the raw data may be textual transcripts, audio files, and/or any other information associated with the discussion); etc.

In one or more embodiments, an earnings call transcript may refer to a text document in which a financial performance, a financial strategy, and a future outlook of an organization for a given time period (e.g., a quarter of a year) may be disclosed. The disclosed information may be structured or organized into any number of headings or sections. In turn, each heading/section may include or recite any number of sentences or lines of text that provides information describing or detailing the heading/section. Examples of headings/sections breaking down any earnings call transcript may include, but not limited to: an introduction, a safe harbor statement, an overview, detailed financial results, Q&A (e.g., specifying a communication between an analyst person and an executive person regarding the organization's performance), a discussion (specifying, for example, a first identifier of the stakeholder, a second identifier of the analyst person, a timestamp encoding a date and time of an earnings call, a third identifier of the organization, and a health status of a product), and a conclusion. Further, an earnings call transcript may be a current earnings call transcript (for a current time period) or a historical earnings call transcript (for a past time period).

In one or more embodiments, an earnings call transcript may provide valuable insights about an organization's performance and prospects, as well as the perceptions and concerns of investors and/or analysts. For example, an earnings call transcript may provide various different information (regarding an organization's financial performance) to an IR team member (of the organization), in which the information may include, but not limited to, analyst sentiment, a type of an event, investor concerns, market trends, competition and compliance related data, etc. This information may help a stakeholder about making a long-term decision.

In one or more embodiments, analyst sentiment may refer to an underlying emotion or opinion of a corresponding analyst. Any analyst sentiment, moreover, may be defined through a pair of parameters (e.g., a sentiment tone, a sentiment score/confidence, etc.). The sentiment tone may refer to a predicted polarity (or class) of the mood or mentality (e.g., positive, negative, or neutral) expressed by the analyst, whereas the sentiment score/confidence may refer to a numerical value reflecting a likelihood or probability that the sentiment tone is correct.

In one or more embodiments, an earnings statement may refer to a text document in which valuable insights into the operations of an organization, an efficiency of the management of the organization, any underperforming sector(s) of the organization, and a performance of the organization relative to industry peers for a given time period may be disclosed. Said insights may be derived from data presented throughout any earnings statement respective to the revenue, expenses, and profitability (e.g., gains and losses) reported by the organization for a given time period. Further, an earnings statement may be a current earnings statement (for a current time period) or a historical earnings statement (for a past time period).

In one or more embodiments, an earnings call reaction may refer to an analyst rating applicative to an economic stock associated with an organization for a given time period. An earnings call reaction may at least be influenced based on information disclosed in an earnings statement for the same time period, information disclosed during an earnings conference call for the same time period, and other factors (e.g., surveys, research, etc.) that may reveal a financial state of the organization for the same time period. Examples of an earnings call reaction may include, but not limited to: the term "buy" indicating an expectation that the organization's stock will outperform relative to the economic market and thus any investor(s) is/are recommended to buy said organization's stock; the term "sell" indicating an expectation that the organization's stock will underperform relative to the economic market and thus any investor(s) is/are recommended to sell said organization's stock; and the term "hold" indicating an expectation that the organization's stock will be an economic market performer and thus any investor(s) is/are recommended to hold said organization's stock. Further, an earnings call reaction may be a predicted earnings call reaction (for a current time period) or a historical earnings call reaction (for a past time period).

In one or more embodiments, a market metric may refer to a performance indicator, which may quantify an aspect of the macro-economy for a given time period. Analysts, investors, and other stakeholders may come to understand current and future economic activity and opportunity using any number of market metrics. Examples of a market metric may include, but not limited to, a gross domestic product (GDP), an unemployment rate, consumer spending, an inflation measure (e.g., consumer price index (CPI)), GDP growth, and a prime interest rate. Further, a market metric may be a current market metric (for a current time period) or a historical market metric (for a past time period).

In one or more embodiments, sentence sentiment may refer to an underlying emotion or opinion behind a given sentence (or line of text). Any sentence sentiment, moreover, may be defined through a pair of parameters (e.g., a sentiment tone, a sentiment score/confidence, etc.). The sentiment tone may refer to a predicted polarity (or class) of the mood or mentality (e.g., positive, negative, or neutral) expressed in the given sentence, whereas the sentiment score/confidence may refer to a numerical value reflecting a likelihood or probability that the sentiment tone is correct. Further, sentence sentiments may include any number of sentence sentiments for any number of sentences (or lines of text), respectively, selected from each earnings call transcript.

In one or more embodiments, transcript sentiment may refer to an underlying emotion or opinion behind a given earnings call transcript (or a collection of lines of text). Any transcript sentiment, moreover, may be defined through a pair of parameters (e.g., a sentiment tone, a sentiment score/confidence, etc.). The sentiment tone may refer to a predicted polarity (or class) of the mood or mentality (e.g., positive, negative, or neutral) expressed in the given earnings call transcript, whereas the sentiment score/confidence may refer to a numerical value reflecting a likelihood or probability that the sentiment tone is correct. Further, transcript sentiments may include a transcript sentiment for each earnings call transcript.

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for the IN (120)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (I2C) for various INs in the system (100)), a configurable storage space option (e.g., a list of disk cloning technologies across one or more INs in the system (100)), a configurable storage input/output (I/O) option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., apriority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, metadata (e.g., system logs, application logs, etc.) may be obtained (or dynamically fetched) as they become available (e.g., with no user manual intervention), or by the analyzer (e.g., 202, FIG. 2.1) polling a corresponding client (e.g., 110A) (by making schedule-driven/periodic application programming interface (API) calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the analyzer (e.g., 202, FIG. 2.1) receives a metadata analysis request (or a heath check request for a client), (ii) another IN of the system (100) accumulates the metadata and provides them to the analyzer at fixed time intervals, or (iii) the database (135) stores the metadata and notify the analyzer to access the metadata from the database. In one or more embodiments, metadata may be access-protected for a transmission from a corresponding client (e.g., 110A) to the analyzer (e.g., 202, FIG. 2.1), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer system logs are received, a state of the analyzer (e.g., 202, FIG. 2.1) is changed, etc.

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

While FIG. 1 shows a configuration of components, other system configurations may be used without departing from the scope of the embodiments disclosed herein.

Turning now to FIG. 2.1, FIG. 2.1 shows a diagram of an IN (200) in accordance with one or more embodiments disclosed herein. The IN (200) may be an example of the IN discussed above in reference to FIG. 1. The IN (200) includes the analyzer (202), the document attention module (204), the engine (206), and the visualizer (208). The IN (200) may include additional, fewer, and/or different components without departing from the scope of the embodiments disclosed herein. Each component may be operably connected to any of the other component via any combination of wired and/or wireless connections. Each component illustrated in FIG. 2.1 is discussed below.

In one or more embodiments, the analyzer (202) may include functionality to, e.g.: (i) receive/obtain distributed metadata (e.g., distributed logs) coming from different clients to get a logical view of all logs relevant to process a specific request (e.g., received from an administrator); (ii) use parameters/details available in distributed logs in order to, at least, (a) trace a specific request through a distributed system (e.g., 100, FIG. 1), (b) identify potential errors (e.g., performance issues) occurred while processing the specific request (e.g., which application was down while processing the specific request, what caused that application to went down, etc.), (c) trace requests that display high-latency across all applications (e.g., microservices), (d) in conjunction with the engine (206), reduce mean time to troubleshooting performance issues, (e) in conjunction with the engine (206), get immediate root cause identification of every application impact, and (f) improve user experience by re-establishing end-to-end interoperability; (iii) based on (ii), infer dependencies and connectivity among applications executing on the system (e.g., which applications are working together, which ports are open, etc.); (iv) monitor performance (e.g., a health status) of a client (e.g., 110A, FIG. 1) by obtaining telemetry data (e.g., metadata, computing resource utilization data (or key performance metrics) of hardware and/or software components, etc.) associated with the client; (v) based on (iv) and for each hardware or software component (of the client), derive a continuous average resource utilization value with respect to each computing resource; (vi) based on (iv) and for each hardware or software component (of the client), derive minimum and maximum resource utilization values with respect to each computing resource; (vii) identify health of each component based on average, minimum, and maximum resource utilization values; (viii) based on (vii), automatically react and generate alerts if one of the predetermined maximum resource utilization value thresholds is exceeded; (ix) provide identified health of each component (and, indirectly, health of the client) and generated alerts (if any) to other entities (e.g., 206) in order to manage the health of the client; and/or (x) store monitored resource utilization data and generated alerts (if any) to the database (e.g., 135, FIG. 1) to generate a resource utilization map.

In one or more embodiments, while monitoring, the analyzer (202) may need to, for example (but not limited to): inventory one or more hardware and/or software components of a client (e.g., 110A, FIG. 1); obtain type and model information of each component of a client; obtain a version of firmware or other code executing on a component of a client; obtain information specifying each component's interaction with one another in a client and/or with another component of a second client; etc.

In one or more embodiments, the analyzer (202) may derive minimum and maximum resource utilization values (with respect to each computing resource) as a reference to infer whether a continuous average resource utilization value (with respect to each computing resource) is derived properly. If there is an issue with the derived continuous average resource utilization value, based on the reference, the analyzer (202) may re-derive the continuous average resource utilization value.

In one or more embodiments, the resource utilization map may be implemented using one or more data structures that include information regarding the utilization of computing resources (e.g., a hardware resource, a software resource, a CPU, memory, etc.) of the IN (200). The resource utilization map may specify, for example (but not limited to): an identifier of a microservice, an identifier of a computing resource, an identifier of a resource that has been utilized by a microservice, etc.

The resource utilization map may specify the resource utilization by any means. For example, the resource utilization map may specify an amount of utilization, resource utilization rates over time, power consumption of applications/microservices while utilized by a user, workloads performed using microservices, etc. The resource utilization map may include other types of information used to quantify the utilization of resources by microservices without departing from the scope of the embodiments disclosed herein.

In one or more embodiments, the resource utilization map may be maintained by, for example, the analyzer (202). The analyzer (202) may add, remove, and/or modify information included in the resource utilization map to cause the information included in the resource utilization map to reflect the current utilization of the computing resources. Data structures of the resource utilization map may be implemented using, for example, lists, tables, unstructured data, structured data, etc. While described as being stored locally, the resource utilization map may be stored remotely and may be distributed across any number of devices without departing from the scope of the embodiments disclosed herein.

Further, the analyzer (202) may include functionality to, e.g.: (i) obtain/retrieve, at least, historical earnings call transcripts from the database (e.g., 135, FIG. 1); (ii) based on (i) and by employing a linear model, a non-linear model, and/or an ML model, analyze the transcripts to extract a dataset; (iii) by employing a set of linear, non-linear, and/or ML models (e.g., single modality embedding transform models, multimodal embedding transform models, etc.), transform the dataset into a set of embedding vectors (e.g., an embedding vector for the discussion section of a transcript, an embedding vector for the Q&A section of the transcript, etc.); and/or (iv) based on (iii), provide the embedding vectors (or embeddings) to the document attention module (204).

In one or more embodiments, the analyzer (202) may be configured to identify and/or extract a dataset (e.g., a collection of sentences representing the discussion and Q&A sections of each transcript), which will be used (by the engine (206)) to perform a sentiment analysis process. Particularly, of any earnings call transcript, certain headings/sections may provide valuable insights into an overall sentiment of an organization, their performance, and prospective market reactions influenced by the content discussed (and reflected via one or more sentences or lines of text) in said certain headings/sections. Said certain headings/sections may be pertinent to the sentiment analysis process, and therefore, any earnings conference call to be conducted that may be based on said original earnings call transcript.

As discussed above, the analyzer (202) may at least be configured to perform text vectorization entailing the translation of certain text (e.g., a sentence) to a numerical representation (or a text embedding) thereof. Any text embedding may be expressed as a vector or array reflecting an ordered sequence of numbers, where the vector/array may be of any arbitrary size (i.e., have any number of vector/array elements). Further, each numerical value forming said text embedding may reference a dimension (i.e., often depicted as a word) within a vocabulary (i.e., any number of unique words) chosen from a corpus (i.e., collection of texts in the finance domain). The numerical values themselves may each, for example, indicate: whether the corresponding dimension/word appears in a given sentence (where the vector/array is described as sparse); or a frequency of said dimension/word that appears in the given sentence (where the vector/array is described as dense).

One of ordinary skill will appreciate that the analyzer (202) may perform other functionalities without departing from the scope of the embodiments disclosed herein. The analyzer (202) may be implemented using hardware (e.g., any number of integrated circuits for processing computer readable instructions), software (e.g., a computer program executing on the underlying hardware of the IN (200)), or any combination thereof.

In one or more embodiments, as being an ML mechanism, the document attention module (204) may include functionality to, e.g.: (i) obtain/receive embedding vectors (that are, at least, associated with the Q&A and discussion sections of the transcripts) as input metrics from the analyzer (202), in which the embedding vectors may be represented by an "N×M×D" matrix (where N refers to the number of transcripts, M refers to the number of sentences in each transcript, and D refers to dimension of each embedding vector); (ii) through a set of recurrent neural networks (RNNs) and an attention network, analyze (iteratively) the embedding vectors to extract the most important features (e.g., specific tokens/words) in the embedding vectors (or, indirectly, the most important features in the Q&A and discussion sections of the transcripts); (iii) generate a first matrix that includes the most important features (e.g., a "N×B" matrix, where B represents the most important features within the embedding vectors); (iv) by employing a cosine similarity function and based on the first matrix, generate a second matrix (e.g., a similarity matrix) that specifies/represents relative distances between the transcripts (more specifically, between embedding vectors of relevant sections) (so that, through the similarity matrix, a relationship/connection between each document/transcript can be inferred (e.g., which transcripts are related to Analyst G, common mistakes that have been made based on Transcript A and Transcript T, etc.)); (v) based on the connection between each transcript, assign an attention score (or a priority weightage) to each embedding vector (where each attention score will have importance when the engine (206) employs an adaptive k-hop learning model); (v) based on the similarity matrix and attention scores, generate a graph structure (e.g., the "N×N" graph in FIG. 2.2) and convert the graph structure to an adjacency matrix (where N is the number of nodes in the graph and it is used to represent the connections between the edges of the graph); and/or (vi) based on (v), provide the adjacency matrix to the engine (206) as the second matrix.

One of ordinary skill will appreciate that the document attention module (204) may perform other functionalities without departing from the scope of the embodiments disclosed herein. The document attention module (204) may be implemented using hardware, software, or any combination thereof.

As illustrated more in detail in FIG. 2.2, graphs may provide the ability to uncover insights within earnings call transcripts. In theory, using graphs may be a valid modality to represent relationships between each transcript (because graphs may capture complex relationships (e.g., in the earnings call of Financial Year 2023 (FY23) Quarter 1 (Q1), Analyst D was asking about Topic A and, now, in the earnings call of FY23 Q3, Analyst D is asking about Topic B) that other modalities cannot). However, in practice, scaling graphs often fails because of the manual intervention required for tuning neighborhood size.

To overcome this challenge, the engine (206) employs the adaptive k-hop learning model/approach to automatically learn the best neighboring size. This model achieves this by learning independent k-hops for each selected/relevant transcript, which helps learning the interdependency of each selected transcript (e.g., Transcript A and Transcript C are dependent because, in both transcripts, Analyst R provided comments regarding the performance of Computing Device E). Further, this approach may be scaled to any modality and may provide a solution to the constant k-hops in graph representation learning.

More specifically, after obtaining/receiving the adjacency matrix (as the second matrix) from the document attention module (204) and by employing the adaptive k-hop learning model, the engine (206) determines a k-hop value (or an optimal k-hop value) for each "selected" transcript. While determining a k-hop value for a transcript (e.g., where a node represents an embedding vector of the transcript), the model may consider node to node distances (e.g., neighboring sizes) between the node and other nodes, interdependency of the node, and a corresponding attention score of the embedding vector. By this way, the model will not hop to all the nodes illustrated in the adjacency matrix to infer some contextual meaning relevant to the node. Said another way, the model will not hop/visit each node to complete a sentence (e.g., if k=5 (meaning that 5 nodes are selected) and there are 10 nodes in total, the model will only hop the selected nodes).

For example, assume a scenario where the adjacency matrix includes Nodes A-D. Because the model needs to find a node that is the most closest and makes more contextual meaning with Node A (in order to complete a sentence), the model may hop to Node B and then Node C (where the k-hop value for the corresponding transcript is 2), rather than hopping to Node D, Node B, and then Node C.

Further, the process of performing the adaptive k-hop learning model can be explained as following:

A message (e.g., text embedding vector) passing to a graph neural network (GNN), which can be defined as:

$$H^{(l)} = \gamma^{(l)}\left(\varphi^{(l)}\left(H^{(l-1)}\right), G\right)$$

In the above equation, G represents a graph (G=(V,E)), H represents the matrix of embedding vectors of all nodes, φ represents one or more trainable parameter matrices, and γ represents an elementwise non-linearity function (e.g., a rectifier activation function, a hyperbolic tangent function, etc.). For example, after k iterations of GNN message passing, H may encode information about the degrees of all the nodes in the k-hop neighborhood for the $l^{th}$ layer.

The model first sums the messages incoming from the neighbors and, then, combines the neighborhood information with a corresponding node's previous embedding vector using a linear combination. Thereafter, the model applies the elementwise non-linearity function.

The aforementioned combination process can be explained as a matrix multiplication between a weighted adjacency matrix (Ã) (which is a transition matrix) and the node representation matrix H:

$$\varphi(H) = HW_\gamma(\hat{H}, G) = \hat{D} - \frac{1}{2}\tilde{A}\hat{D} - \frac{1}{2}\hat{H}$$

In the above equation, W refers to residual linear transformation and $\tilde{D}$ is a diagonal matrix ($D_{ii}=\Sigma N_{j=1}A_{ij}$). Further, to hop from one node to another (and how many hops at the end) can be calculated by a learnable hop, which is formulated as shown below by defining the radius of the influence of a node (e.g., which node indicates some meaning context to complete a corresponding sentence):

$$r = \frac{\sum_{k=0}^{\infty} \theta_k k}{\sum_{k=0}^{\infty} \theta_k}$$

In the above equation, $\theta_k$ denotes the influence from k-step-away nodes and r is the distance/radius.

$$\gamma^{(l)}\left(\hat{H}, G\right) = \sum_{k=0}^{\infty} \theta_k T^k \hat{H}$$

$$\frac{dx_i(t)}{dt} = -\sum_{j \in N(i)} \tilde{A}_{ij}(x_i(t) - x_j(t))$$

$$X(t) = H_t X(0)$$

$$r_h = \frac{\sum_{k=0}^{\infty} \theta_k k}{\sum_{k=0}^{\infty} \theta_k} = \frac{\sum_{k=0}^{\infty} e^{-t}\frac{t^k}{k!}}{\sum_{k=0}^{\infty} e^{-t}\frac{t^k}{k!}} = \frac{e^{-t}\sum_{k=0}^{\infty} e^{\frac{t^k}{k!}}}{e^{-t}\sum_{k=0}^{\infty} e^{\frac{t^k}{k!}}} = \frac{e^{-t}(e^t t)}{e^{-t} e^t} = t$$

$$\gamma^{(l)}\left(\hat{H}, G\right) = e^{-Lt}\hat{H} = \sum_{k=0}^{\infty} e^{-t}\frac{t^k}{k!} T^k \hat{H}$$

$$t^* = \arg\min_t \mathcal{L}_{val}(t, w^*(t))$$

$$w^*(t) = \arg\min_w \mathcal{L}_{train}(t, w)$$

$$w^{(e+1)} = w^{(e)} - \alpha_1 \nabla_w \mathcal{L}_{train}\left(t^{(e)}, w^{(e)}\right)$$

$$t^{(e+1)} = t^{(e)} - \alpha_2 \nabla_t \mathcal{L}_{val}\left(t^{(e)}, w^{(e+1)}\right)$$

As indicated in the above equations, at each iteration, every node aggregates information from its logical neighborhood, and as these iterations progress, each node obtains more and more information regarding other nodes in the graph. More precisely, after the first iteration (k=1), each node includes information regarding its 1-hop away neighbor(s). Said another way, each node includes information about the features of its immediate graph neighbors, which can be reached by a path of length "1" in the graph.

After the second iteration (k=2), each node includes information regarding its 2-hop away neighbor(s). In general, after "k" iterations, each node will include information regarding its k-hop neighbor(s).

$$\gamma^{(l)}\left(\hat{H}, G\right)_i = \sum_{k=0}^{K} e^{-t_i^{(l)}}\frac{\left(t_i^{(l)}\right)}{k!} T^k \hat{H}_i, \gamma^{(l)}\left(\hat{H}, G\right)_i = \sum_{k=0}^{K} \theta_{ki}^{(l)} T^k \hat{H}_i$$

In the above equations, the k-hop intermediate representation vector of node "i" and $\theta_{ik}$ can be viewed extracted from a "node-wise, hop-wise tensor", in which the previous weighting matrix can be extracted from this tensor by selecting the k-hop. In some cases, to explicitly enhance the position (hop) information, the model may consider intermediate multi-hop representation vectors with learnable positional embeddings.

In one or more embodiments, after determining a k-hop value for each "selected" transcript, the engine (206) may analyze k-hop values (of selected transcripts) and the adjacency matrix (i.e., the second matrix) to infer underlying relationships/patterns in the adjacency matrix. Then, by employing a graph representation learning model (e.g., a graph attention network), the engine (206) may generate a graph representation (see FIG. 2.2) based on the underlying relationships, in which the graph representation is provided to the visualizer (208).

Said another way, (i) by acting as a graph representation learning component and (ii) based on the graph structure (generated by the analyzer (202)) and k-hop values (of selected transcripts), the engine (206) may generate low-dimensional vectors that encode the structural information of the graph structure in a continuous vector space. To this end, the engine (206) may capture the underlying patterns and relationships in the graph structure (so that ML models (e.g., a pre-trained sentiment classification model, a support vector machine model, a long short-term memory model, etc.) may make accurate predictions on the graph structure towards generating meaningful sentences).

In one or more embodiments, by employing the graph attention network, the engine (206) may infer the contributions of neighboring nodes when aggregating information. More specifically, the graph attention network may implement a self-attention mechanism that allows the engine (206) to weigh the importance of a node's neighbors when aggregating information. Further, the graph attention network may also implement a multi-headed attention layer, in which each head corresponds to a different attention mechanism that allows the engine (206) to consider a different subset of the neighboring nodes.

In one or more embodiments, weighing the importance of a node's neighbors when aggregating information may be important when there are two or more hop recommendations to obtain a complete, meaningful sentence. For example, consider a scenario in which there are two hop recommendations to obtain a complete, meaningful sentence: (i) Node A→Node J→Node L and (ii) Node A→Node K→Node N. With the help of the attention mechanisms provided by the graph attention network, the engine (206) may consider the first hop recommendation (Node A→Node J→Node L) rather than the second hop recommendation.

In one or more embodiments, by acting as a graph representation learning component, the engine (206) ensures that the most complex relationships/patterns in the graph structure are extracted. To this end, the engine (206) may implement a single, custom loss function that learns the graph structure (e.g., the relationships between nodes, independency of each node, etc.) in one pass (to solve a multi-objective optimization problem), rather than defining two different loss functions.

In one or more embodiments, after generating the graph representation (where only the selected nodes are included) based on the underlying relationships, the engine (206) may employ a specialized ML model (e.g., an auto-regressive language model, a pre-trained sentiment classification model, a deep reinforcement learning model, a supervised-learning language model, a transformer-based model, etc.) that is trained and/or fine-tuned on financial data available in the database (e.g., 135, FIG. 1) (especially earnings call transcripts that are manually labelled by a relevant IR team) to derive/infer/classify transcript sentiments. As discussed above, an earnings call transcript may provide (to corresponding executives) the information required to make investment decisions. For example, an earnings call transcript may include financial data such as fluctuations in cash, short-term investments, debt sales details, share counts, and other insights that may affect an investor's decision-making process.

Further, earnings calls have been shown to have an immediate impact on stock prices. For example, one of the most searched signals in earnings calls is performing a sentiment analysis, in which this analysis is a process of systematically extracting and quantifying affective states (e.g., positive, negative, or neutral). There are many conventional ML models that can be applied for sentiment classification (where, for example, sentiment of a financial document (or at least a portion thereof) may sway the movement of an organization's share price); however, these models are not suitable for sentiment classification in the finance domain because finance uses a specialized language that these models do not understand.

For at least the aforementioned reasons, the engine (206) employs the specialized ML model that is trained and/or fine-tuned on a financial corpus to perform sentiment analysis on earnings calls (where the specialized model requires fewer training samples than other language models). For example, as being a transformer-based pre-trained auto-regressive language model (which blends modeling techniques from auto-encoder models into auto-regressive models), the specialized ML model may extract feature information from text to learn hidden representations from a current earnings call and generates sentiment scores at a sentence level, as well as at a transcript/document level, and assigns sentiment polarity (e.g., positive, negative, or neutral) to the sentence and/or transcript.

In one or more embodiments, the financial corpus may include open-sourced earnings call transcripts of many public organizations. For example, the corpus may consists of 66,600 transcripts which have speech delivered by higher management and Q&A session by investors and analysts that were published by companies on a quarterly and/or fiscal year basis. The resulting corpus may include 30 million sentences with 4 billion words.

In one or more embodiments, the specialized model may employ permutational language modeling techniques. To cover both forward and backward directions, the specialized model may evaluate all potential permutations. For example, during training of the model, the engine (206) may use a permutation operation to allow context to include tokens from both the left and right sides of a text, capturing the bidirectional context. The specialized model may maintain the original sequence order, employ positional encodings, and employ a specific attention mask in transformers to achieve the factorization order permutation.

Further, by employing the specialized model, the engine (206) may generate content that conveys precise information in a manner that can prompt favorable market reactions, while mitigating unfavorable market reactions, from corresponding executives (e.g., investors, analysts, stakeholders, etc.).

To be more specific, after generating the graph representation based on the underlying relationships, by employing a set of linear, non-linear, and/or ML models (e.g., a set of transform models), the engine (206) may transform the graph representation into a second set of embedding vectors (including, at least, word embedding vectors and character embedding vectors for each sentence). The engine (206), via the specialized model, may then analyze the second set of embedding vectors to extract a set of features (e.g., profit, loss, etc.), in which the engine (206) may analyze the set of features to generate a sentiment score for each sentence (e.g., a sentence sentiment) of selected transcripts provided in the graph representation.

Thereafter, in one or more embodiments, the engine (206) classifies each sentence (e.g., of a selected transcript) based on its sentiment score (to understand the meaning behind each sentence). For example, after performing the sentiment analysis (or the sentiment prediction for each sentence), the engine (206) classifies (or predict that) Sentence A as (or is) a positive sentence and Sentence B as (or is) a negative sentence. As yet another example, because the sentiment score of Sentence R is 0.67 (which is above a pre-determined polarity threshold), the engine (206) predicts Sentence R as a positive sentence. As yet another example, because the sentiment score of Sentence Y is −0.22 (which is below the pre-determined polarity threshold), the engine (206) predicts Sentence Y as a negative sentence.

In one or more embodiments, after the classification is performed, the engine (206) infers sentiment of the selected transcript (in entirety) based on each sentence's sentiment score. For example, based on each sentence's sentiment score, the engine (206) may infer the overall/average sentiment (or sentiment score) of the selected transcript as a positive transcript. The engine (206) may then provide the sentiment of the selected transcript and sentiment of each sentence to the visualizer (208).

Further, in one or more embodiments, using the visualizer (208), the engine (206) may initiate displaying of the graph representation, sentiment of the selected transcript, and sentiment of each sentence to an administrator/executive/IR expert. By this way, the engine (206), at least: (i) provides a financial narrative of a corresponding organization through time and around hard data (or operational metrics) and (ii) uncovers hidden representations both within and between transcripts (e.g., Analyst A provided negative feedback (regarding the organization's performance) during the call, Analyst T was neutral during the call, Analyst B asked performance related questions, Analyst R made a recommendation during the call, etc.).

Based on (i) and (ii), the executives may, at least: (a) understand where communication on the most recent earnings call lies; (b) learn the essence of the communication in the context of the organization's financial history; (c) understand and track each analyst's sentiment during the call; (d) understand and track each investor's sentiment during the call; (e) understand the points/themes that are missed; (f) based on (a)-(e), take actions during the current call (e.g., delivering a speech in a positive way rather than just providing negative responses to negative questions asked by the analysts, modifying a speech (during the call) in such a way that the speech should not sound so negative, etc.); and/or (g) based on (a)-(f), make informed decisions and be prepared before going to the next earnings call.

Further, the engine (206) may include functionality to, e.g.: (i) in conjunction with the analyzer (202), provide a useful ML-based framework to the administrator to at least assist the administrator for accurately detecting one or more anomalies in, for example, system logs (of a client) and to increase the administrator's performance (in terms of taking actions to (a) remediate hardware/software component related issues (occurred in the client) faster and/or (b) prevent any future hardware/software component related issues that may occur on the client); (ii) in conjunction with the analyzer (202) and the visualizer (208), automate at least some of the "issue detection" tasks/duties assigned to the administrator for a better administrator experience; and/or (iii) in conjunction with the analyzer (202), analyze metadata (e.g., system logs, application logs, etc.) obtained from a client (a) to identify health (or health information) of each component of the client, (b) to tag/label each component as "healthy" or "unhealthy" for troubleshooting and optimization purposes (of the client), (c) to infer an overall health status of the client, and (d) to generate a device state path for the client (e.g., from a healthy device state to an unhealthy device state) (which may be useful for the administrator to infer how a hardware component failure has occurred (in the client) and to identify the various states that the client was in).

In one or more embodiments, the engine (206) may generate a device state chain (of a client) using a device state path (which corresponds to device states up to a current device state), a current device state, and a next device state of the client. As indicated, while generating the device state chain, not just the previous device state is considered, but the whole device state path is considered. For example, the engine (206) may generate a device state chain as A→B (where B is the current device state of a client) and B→C (where A represents "fan failure", B represents "overheating of CPU", and C represents "CPU failure"). In this example, the engine (206) (i) may calculate the probability of "A→B" in the device state chain as 0.2 and (ii) may calculate the probability of "B→C" in the device state chain as 0.3, where the probability of the device state chain "A→B→C" may be calculated as 0.06.

As discussed above, the engine (206) may infer a current device state of a device (e.g., a client) based on metadata (obtained from the client), in which the current device state may indicate a device state where a hardware component failure was reported. In one or more embodiments, the engine (206) may include a list of device states (associated with the client) where the client transitioned and, among the list of device states, a next device state may be the device state that has the highest probability to become the next device state.

In one or more embodiments, the engine (206) may initiate, for example, displaying of (i) identified/tagged health of a corresponding client, (ii) a holistic user profile of a user of the client, and/or (iii) analyzer generated alerts to an administrator via the visualizer (208) (e.g., via a GUI, an API, a programmatic interface, and/or a communication channel of the visualizer) to indicate an overall health status of the client. In one or more embodiments, for example, (i) each data item (e.g., identified health of the client, an analyzer generated alert, etc.) may be displayed (e.g., highlighted, visually indicated, etc.) with a different color (e.g., red color tones may represent a negative overall health status of the client, green color tones may represent a positive overall health status of the client, etc.), and (ii) one or more useful insights/recommendations with respect to the overall health status of the client may be displayed in a separate window(s) on the visualizer (208) to assist the administrator while managing the overall health status of the client (e.g., for a better administrator experience, to help the administrator with respect to understanding the benefits and trade-offs of selecting different troubleshooting options, etc.).

Further, the visualizer (208) may include functionality to, e.g.: (i) obtain (or receive) data (e.g., any type and/or quantity of input) from any source (e.g., a user via a client (e.g., 110A, FIG. 1), the engine (206), etc.) (and, if necessary, aggregate the data); (ii) based on (i) and by employing a set of linear, non-linear, and/or ML models, analyze, for example, a query to derive additional data; (iii) encompass hardware and/or software components and functionalities provided by the IN (200) to operate as a service over the network (e.g., 130, FIG. 1) so that the visualizer (208) may be used externally; (iv) employ a set of subroutine definitions, protocols, and/or hardware/software components for enabling/facilitating communications between, for example, the engine (206) and external entities (e.g., clients, administrators, etc.); (v) by generating one or more visual elements, allow an administrator to, at least, interact with a user of a corresponding client; (vi) receive a customer/user profile of a customer and display the customer profile to an administrator (e.g., for monitoring and/or performance evaluation); (vii) concurrently display one or more separate windows, for example, on its GUI; and/or (viii) generate visualizations of the method illustrated in FIGS. 3.1-3.3.

One of ordinary skill will appreciate that the visualizer (208) may perform other functionalities without departing from the scope of the embodiments disclosed herein. The visualizer (208) may be implemented using hardware, software, or any combination thereof.

One of ordinary skill will appreciate that the engine (206) may perform other functionalities without departing from the scope of the embodiments disclosed herein. The engine (206) may be implemented using hardware, software, or any combination thereof.

In one or more embodiments, the IN (200) may further include an interface, that refers to networking hardware (e.g., a network card or adapter), a computer program implementing a logical interface (e.g., an API), an interactivity protocol, or any combination thereof, at least configured to enable or facilitate communications (or information exchange) between the components of the IN (200) and other entities (e.g., any client(s) (see e.g., FIG. 1)).

In one or more embodiments, the analyzer (202), the document attention module (204), the engine (206), and the visualizer (208) may be utilized in isolation and/or in combination to provide the aforementioned functionalities. These functionalities may be invoked using any communication model including, for example, message passing, state sharing, memory sharing, etc.

Turning now to FIG. 2.2, FIG. 2.2 shows an example use case in which a representation that narrates the financial performance of an organization is provided to an entity (e.g., an administrator, an executive, etc.) in accordance with one or more embodiments disclosed herein.

Referring to FIG. 2.2., the analyzer (e.g., 202, FIG. 2.1) first obtains historical earnings call transcripts (e.g., Q1 FY05, Q3 FY23, etc.) and analyzes the transcripts to extract a dataset. The analyzer then transforms the dataset into a set of embedding vectors and provides these embedding vectors to the document attention module (e.g., 204, FIG. 2.1). The document attention module then analyzes the embedding vectors to extract the most important features in the embedding vectors and generates a first matrix (not shown) that includes the most important features.

Further, by employing cosine similarity and based on the first matrix, the document attention module generates a second matrix that specifies relative distances between the transcripts, in which the second matrix is converted into the "N×N" graph structure. As indicated, the "N×N" graph structure shows some connections between each transcript (e.g., each node) but the graph structure does not show the actual relationships between each transcript. The document attention module then provides the "N×N" graph structure (as the second matrix) to the engine (e.g., 206, FIG. 2.1).

After receiving the second matrix and by employing the adaptive k-hop learning model, the engine determines a k-hop value for each "selected" transcript based on the second matrix. The engine then analyzes k-hop values (of selected transcripts) and the second matrix to infer underlying relationships/patterns in the second matrix. Thereafter, by employing a graph representation learning model, the engine generates a graph representation (or an organization narrative graph) based on the underlying relationships, in which the graph representation is provided to the visualizer (e.g., 208, FIG. 2.1).

As indicated, the graph representation (e.g., of the transcripts) (i) shows the actual relationships (e.g., the actual connectivity) between each transcript in terms of financial data details (and the financial health of the organization), (ii) enriches qualitative financial data, (iii) provides a summarization of the objectives, financial performance, and sentiment of the organization through time (e.g., with respect to its stakeholders), and/or (iv) communicate a narrative of the organization that can help the administrator to gain insights into where the current earnings stand in the context of the organization's past.

Thereafter, the engine transforms the graph representation into a second set of embedding vectors. The engine then employs a language model (e.g., the specialized model) to analyze the second set of embedding vectors to extract a set of features and analyzes those features to generate a sentiment score for each sentence (of a selected transcript provided in the graph representation). The engine then classifies each sentence (of the selected transcript) based on its sentiment score, in which the sentiment (or the "overall" sentiment score) of the selected transcript is inferred based on each sentence's sentiment score. As indicated, the "overall" sentiment score of "Q1 FY05" transcript is 0.67 (which means the transcript mostly includes positive sentences) and based on that, the engine infers "Q1 FY05" transcript as a positive transcript. Further, the "overall" sentiment score of "Q3 FY23" transcript is −0.22 (which means the transcript mostly includes negative sentences) and based on that, the engine infers "Q3 FY23" transcript as a negative transcript (which needs to be further analyzed to understand missing points and/or what went wrong in this earnings call to become prepared for the next call). The engine then provides the sentiment of selected transcript (and sentiment of each relevant sentence) to the visualizer, in which the visualizer initiates displaying of the graph representation, sentiment of the selected transcript, and sentiment of each sentence to the administrator.

FIGS. 3.1-3.3 show a method for managing financial performance of an organization in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3.1, the method shown in FIG. 3.1 may be executed by, for example, the above-discussed analyzer (e.g., 202, FIG. 2.1) and document attention module (e.g., 204, FIG. 2.1). Other components of the system (100) illustrated in FIG. 1 may also execute all or part of the method shown in FIG. 3.1 without departing from the scope of the embodiments disclosed herein.

In Step 300, the analyzer receives a request from a requesting entity (e.g., an administrator of the IN (e.g., 200, FIG. 2.1), an administrator terminal, an application, etc.) that wants to look into the financial performance of the organization.

In response to receiving the request, as part of that request, and/or in any other manner (e.g., before initiating any computation with respect to the request), the analyzer invokes the database (e.g., 135, FIG. 1) to communicate with the database. After receiving the database's confirmation, the analyzer obtains historical earnings call transcripts from the database. In one or more embodiments, the transcripts may be obtained continuously or at regular intervals (e.g., every 2 minutes) (without affecting production workloads of the database and the analyzer). Further, the transcripts may be access-protected for the transmission from, for example, the database to the analyzer, e.g., using encryption.

In one or more embodiments, the transcripts may be obtained as it becomes available or by the analyzer polling the database (via one or more API calls) for newer information. For example, based on receiving an API call from the analyzer, the database may allow the analyzer to obtain newer information.

In one or more embodiments, an earnings call transcript may include (or specify), for example (but not limited to): a pre-defined topic for discussion, information with respect to investors, information with respect to business investments, operational costs, future plans of the organization moving forward, etc.

In Step 302, by employing a set of linear, non-linear, and/or ML models, the analyzer analyzes the transcripts to extract a dataset. In one or more embodiments, the analysis may include filtering the transcripts based on a common template, in which the common template may include (or specify), for example (but not limited to): a header section, an overview section, an introduction section, a discussion section, a Q&A section, a conclusion section, etc.

At the end of the filtering, the dataset may only include or recite a collection of sentences (or lines of text) representing the discussion and Q&A sections (of the transcripts), in which these sections may specify detailed financial information and insights to capture an overall sentiment of the organization, their performance, and prospective market reactions influenced by the content discussed in said sections. In one or more embodiments, the analyzer may store (temporarily or permanently) the dataset to the database.

In Step 304, by employing a set of linear, non-linear, and/or ML models, the analyzer transforms the dataset into a set of embedding vectors (e.g., an embedding vector (or a text embedding) for the discussion section of a transcript, an embedding vector (or a text embedding) for the Q&A section of the transcript, etc.).

In one or more embodiments, a text embedding may generally refer to a numerical representation of a sentence or line of text (e.g., a sentiment-pertinent transcript sentence), which may be suited for computer-based text semantics analysis. Each said text embedding may be expressed as a vector or array reflecting an ordered sequence of numbers, in which the vector/array may be of any arbitrary size (i.e., have any number of vector/array elements). Further, each numerical value forming said text embedding may reference a dimension (i.e., often depicted as a word) within a vocabulary (i.e., any number of unique words) chosen from a corpus (i.e., collection of texts). The numerical values themselves may each, for example, indicate: whether the corresponding dimension/word appears in a given sentence/line of text (where the vector/array is described as sparse); or a frequency of said dimension/word that appears in the given sentence/line of text (where the vector/array is described as dense). Moreover, any earnings call transcript embedding(s) may be generated using any existing text vectorization technique.

Thereafter, in Step 306, the analyzer provides the embedding vectors to the document attention module. In Step 308, through a set of RNNs and an attention network, the document attention module analyzes (iteratively) the embedding vectors to extract the most important features (e.g., specific tokens/words) in the embedding vectors (or, indirectly, the most important features in the Q&A and discussion sections of the transcripts). In Step 310, the document attention module generates a first matrix that includes the most important features.

In Step 312, by employing a cosine similarity function and based on the first matrix, the document attention module generates a second matrix (e.g., a similarity matrix) that specifies/represents relative distances between the transcripts (more specifically, between embedding vectors of relevant sections) (so that, through the similarity matrix, a relationship/connection between each document/transcript can be inferred (e.g., which transcripts are related to Analyst G, common mistakes that have been made based on Transcript A and Transcript T, etc.)).

In one or more embodiments, based on the connection between each transcript, the document attention module assigns an attention score (or a priority weightage) to each embedding vector (where each attention score will have importance when the engine employs the adaptive k-hop learning model (see Step 316 of FIG. 3.2)). Thereafter, based on the similarity matrix and attention scores, the document attention module generates a graph structure (e.g., the "N×N" graph in FIG. 2.2) and convert the graph structure to an adjacency matrix. In Step 314, the document attention module provides the adjacency matrix to the engine (e.g., 206, FIG. 2.1) as the second matrix.

Turning now to FIG. 3.2, the method shown in FIG. 3.2 may be executed by, for example, the above-discussed engine. Other components of the system (100) illustrated in FIG. 1 may also execute all or part of the method shown in FIG. 3.2 without departing from the scope of the embodiments disclosed herein.

In Step 316, by employing the adaptive k-hop learning model, the engine determines an "independent" k-hop value for each "selected" transcript (and the interdependency of the transcript itself) based on the second matrix. Details of the adaptive k-hop learning model and determination of the k-hop value are described above in reference to FIG. 2.1.

In one or more embodiments, the adaptive k-hop learning model may be adapted to execute specific determinations described herein with reference to any component of the system (e.g., 100, FIG. 1) and processing operations executed thereby.

In one or more embodiments, as the adaptive k-hop learning model is a learning model, accuracy of the model may be improved over time through iterations of training (and/or fine-tuning), receipt of user feedbacks, etc. Further, training (and/or fine-tuning) the adaptive k-hop learning model may include application of a training algorithm. As an example, a decision tree (e.g., a Gradient Boosting Decision Tree) may be used to train the adaptive k-hop learning model. In doing so, one or more types of decision tree algorithms may be applied for generating any number of decision trees to fine-tune the adaptive k-hop learning model. In one or more embodiments, training of the adaptive k-hop learning model may further include generating an ML model that is tuned to reflect specific metrics for accuracy, precision and/or recall before the trained ML model is exposed for real-time (or near real-time) usage.

In Step 318, by employing a linear model, a non-linear model, and/or an ML model, the engine analyzes k-hop values (of selected transcripts) and the second matrix to infer underlying relationships in the second matrix (e.g., to infer the hidden patterns within the transcripts). In Step 320, by employing the graph representation model, the engine generates a graph representation based on the underlying relationships. Thereafter, in Step 322, the engine provides the graph representation to the visualizer (e.g., 208, FIG. 2.1).

In Step 324, by employing a set of linear, non-linear, and/or ML models, the engine transforms the graph representation into a second set of embedding vectors. In Step 326, by employing the specialized model (e.g., a language model), the engine analyzes the second set of embedding vectors to extract a set of features. Details of the specialized model are described above in reference to FIG. 2.1.

In one or more embodiments, a set of feature may include (or specify), for example (but not limited to): one or more parameters disclosed in a selected transcript; one or more reactions influenced by one or more historical earnings calls; one or more current market metrics defining a state of the current economics market; one or more sets of historical sentence sentiments for one or more sets of historical sentiment-pertinent transcript sentences; one or more historical transcript sentiments for one or more historical transcripts; etc.

In one or more embodiments, the specialized model may be adapted to execute specific determinations described herein with reference to any component of the system (e.g., 100, FIG. 1) and processing operations executed thereby.

In one or more embodiments, as the specialized model is a learning model, accuracy of the model may be improved over time through iterations of training (and/or fine-tuning), receipt of user feedbacks, etc. Further, training (and/or fine-tuning) the specialized model may include application of a training algorithm. As an example, a decision tree (e.g., a Gradient Boosting Decision Tree) may be used to train the specialized model. In doing so, one or more types of decision tree algorithms may be applied for generating any number of decision trees to fine-tune the specialized model. In one or more embodiments, training of the specialized model may further include generating an ML model that is tuned to reflect specific metrics for accuracy, precision and/or recall before the trained ML model is exposed for real-time (or near real-time) usage.

In Step 328, by employing a linear model, a non-linear model, and/or an ML model, the engine analyzes the set of features to generate a sentiment score/confidence (e.g., a scalar, numerical value expressing a likelihood or probability that the sentiment is correct) for each sentence of a selected transcript provided in the graph representation. In Step 330, the engine classifies each sentence (of the selected transcript) based on its sentiment score (to understand the meaning behind each sentence). For example, after performing the sentiment analysis (or the sentiment prediction for each sentence), the engine may classify (or predict that) Sentence A as (or is) a positive sentence and Sentence B as (or is) a negative sentence.

Turning now to FIG. 3.3, the method shown in FIG. 3.3 may be executed by, for example, the above-discussed engine and visualizer. Other components of the system (100) illustrated in FIG. 1 may also execute all or part of the method shown in FIG. 3.3 without departing from the scope of the embodiments disclosed herein.

In Step 332, after the classification is performed in Step 330 of FIG. 3.3, the engine infers sentiment of the selected transcript (in entirety) based on each sentence's sentiment score. For example, based on each sentence's sentiment score, the engine may infer the overall sentiment (or average sentiment score) of Transcript D as a positive. In Step 334, the engine provides the sentiment of the selected transcript and sentiment of each sentence to the visualizer.

In Step 336, the visualizer initiates displaying of the graph representation, sentiment of the selected transcript, and sentiment of each sentence to an administrator. By this way, (for example, during an ongoing/current earnings call), the administrator may, at least: (i) be informed about the overall sentiment of the organization, its financial performance/strategy (for at least a current time period), and prospective market reactions; (ii) understand where communication on the most recent earnings call lies (including identifying trends and patterns that may not be immediately apparent); (iii) learn the essence of the communication in the context of the organization's financial history and prospective goals of the organization; (iv) understand and track each analyst's sentiment during the call; (v) understand and track each investor's sentiment during the call; (vi) understand the points/themes that are missed (to avoid any misunderstandings or misinterpretations by investors and analysts alike participating in (or reviewing) the future call once held); (vii) based on (i)-(vi), take actions during the current call (e.g., delivering a speech in a positive way rather than just providing negative responses to negative questions asked by the analysts, modifying a speech (during the call) in such a way that the speech should not sound so negative, etc.); (viii) be informed about current call reactions (e.g., predicted investment actions such as buy, sell, or hold assets) concerning organization stock representing ownership shares issued for the organization (which may be prospectively performed by investors and analysts influenced by the current call); and/or (ix) based on (i)-(viii), make informed and data-driven decisions (towards improving performance and competitiveness of the organization) and be prepared before going to the next earnings call.

In one or more embodiments, while displaying information, the visualizer may employ a color coding system. For example, the color coding system may be used in which positive sentiment of a sentence is indicated by green highlighting of the sentence, negative sentiment of a sentence is indicated by red highlighting of the sentence, and a neutral sentiment of a sentence is indicated by no highlighting of the sentence. The level of sentiment (e.g., positive or negative) may be indicated by a degree of the corresponding color. Specifically, a very negative sentiment may be indicated by a darker or a heavier red compared to a softer red corresponding to a less negative sentiment.

In one or more embodiments, the method may end following Step 336.

Turning now to FIG. 4, FIG. 4 shows a diagram of a computing device in accordance with one or more embodiments disclosed herein.

In one or more embodiments disclosed herein, the computing device (400) may include one or more computer processors (402), non-persistent storage (404) (e.g., volatile memory, such as RAM, cache memory), persistent storage (406) (e.g., a non-transitory computer readable medium, a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing an organization's performance, the method comprising:

receiving an adjacency matrix (AM) from a document attention module, wherein the AM is associated with a first graph representation;

obtaining, in response to receiving the AM, an adaptive k-hop learning model;

receiving an output from the adaptive k-hop learning model;

sending the output to a user;

receiving, in response to sending the output, user feedback from the user;

updating the adaptive k-hop learning model based on the user feedback to obtain a trained adaptive k-hop learning model;

determining, by employing the trained adaptive k-hop learning model and in real-time, a first k-hop value for a first transcript and a second k-hop value for a second transcript based on the AM;

analyzing the first k-hop value, the second k-hop value, and the AM to infer:
a relationship between the first transcript and the second transcript, and
a second relationship in the AM;
generating, by employing a graph representation learning model, a second graph representation based on the relationship and the second relationship;
transforming the second graph representation into a set of embedding vectors using a set of linear and non-linear machine learning models;
analyzing, by employing a language model, the set of embedding vectors to extract a set of features;
analyzing the set of features to generate a first sentiment score (SS) for a first sentence of the first transcript and a second SS for a second sentence of the first transcript;
classifying the first sentence as a first negative sentence based on the first SS and the second sentence as a second negative sentence based on the second SS;
inferring an average SS of the first transcript based on the first SS and the second SS, wherein, based on the average SS, the first transcript is classified as a negative transcript;
initiating, via a visualizer, displaying of at least the first SS, the second SS, the average SS, and the second graph representation to an administrator; and
modifying, by the visualizer and based on the first SS, the second SS, the average SS, and the second graph representation, the first transcript as a speech is being presented with the first transcript.

2. The method of claim 1,
wherein the relationship is inferred based on a neighboring size of a first node to a second node in the first graph representation, wherein the first node is associated with the first transcript and the second node is associated with a third transcript,
wherein the first k-hop value is used to determine a first interdependency of the first transcript,
wherein the second k-hop value is used to determine a second interdependency of the second transcript, and
wherein the second relationship is between the second transcript and the third transcript.

3. The method of claim 2, wherein the first interdependency of the first transcript indicates that the first transcript is dependent to the third transcript, wherein the first transcript comprises an analyst person discussing a hardware component and the third transcript comprises the analyst person discussing the hardware component.

4. The method of claim 2,
wherein the first k-hop value is determined based on the neighboring size and a first attention score assigned to the first node,
wherein the second k-hop value is determined based on a second neighboring size of the second node to a third node in the first graph representation and a second attention score assigned to the second node,
wherein the first attention score and the second attention score are used to generate the AM, and
wherein the AM is generated by employing a cosine similarity model.

5. The method of claim 1, wherein the language model is a trained transformer-based sentiment classification model, wherein the language model is trained based on historical earnings call transcripts.

6. The method of claim 1, wherein the set of embedding vectors comprises at least a word embedding vector and a character embedding vector.

7. The method of claim 1, wherein the first transcript is an earnings call transcript, wherein the earnings call transcript comprises information to help a stakeholder about making a long-term decision.

8. The method of claims 7, wherein the information comprises at least one selected from a group consisting of a question and answer section specifying a communication between an analyst person and an executive person regarding the organization's performance, a type of an event, a first identifier of the stakeholder, a second identifier of the analyst person, a timestamp encoding a date and time of an earnings call, a third identifier of the organization, and a health status of a product.

9. A non-transitory computer readable medium (CRM) comprising computer readable program code, which when executed by a computer processor enables the computer processor to perform a method for managing an organization's performance, the method comprising:
receiving an adjacency matrix (AM) from a document attention module, wherein the AM is associated with a first graph representation;
obtaining, in response to receiving the AM, an adaptive k-hop learning model;
receiving an output from the adaptive k-hop learning model;
sending the output to a user;
receiving, in response to sending the output, user feedback from the user;
updating the adaptive k-hop learning model based on the user feedback to obtain a trained adaptive k-hop learning model;
determining, by employing the trained adaptive k-hop learning model and in real-time, a first k-hop value for a first transcript and a second k-hop value for a second transcript based on the AM;
analyzing the first k-hop value, the second k-hop value, and the AM to infer:
a relationship between the first transcript and the second transcript, and
a second relationship in the AM;
generating, by employing a graph representation learning model, a second graph representation based on the relationship and the second relationship;
transforming the second graph representation into a set of embedding vectors using a set of linear and non-linear machine learning models;
analyzing, by employing a language model, the set of embedding vectors to extract a set of features;
analyzing the set of features to generate a first sentiment score (SS) for a first sentence of the first transcript and a second SS for a second sentence of the first transcript;
classifying the first sentence as a first negative sentence based on the first SS and the second sentence as a second negative sentence based on the second SS;
inferring an average SS of the first transcript based on the first SS and the second SS, wherein, based on the average SS, the first transcript is classified as a negative transcript;
initiating, via a visualizer, displaying of at least the first SS, the second SS, the average SS, and the second graph representation to an administrator; and
modifying, by the visualizer and based on the first SS, the second SS, the average SS, and the second graph representation, the first transcript as a speech is being presented with the first transcript.

10. The CRM of claim 9, wherein the relationship is inferred based on a neighboring size of a first node to a second node in the first graph representation, wherein the first node is associated with the first transcript and the second node is associated with a third transcript, wherein the first k-hop value is used to determine a first interdependency of the first transcript, wherein the second k-hop value is used to determine a second interdependency of the second transcript, and wherein the second relationship is between the second transcript and the third transcript.

11. The CRM of claim 10, wherein the first interdependency of the first transcript indicates that the first transcript is dependent to the third transcript, wherein the first transcript comprises an analyst person discussing a hardware component and the third transcript comprises the analyst person discussing the hardware component.

12. The CRM of claim 10, wherein the first k-hop value is determined based on the neighboring size and a first attention score assigned to the first node, wherein the second k-hop value is determined based on a second neighboring size of the second node to a third node in the first graph representation and a second attention score assigned to the second node, wherein the first attention score and the second attention score are used to generate the AM, and wherein the AM is generated by employing a cosine similarity model.

13. The CRM of claim 9, wherein the language model is a trained transformer-based sentiment classification model, wherein the language model is trained based on historical earnings call transcripts.

14. The CRM of claim 9, wherein the set of embedding vectors comprises at least a word embedding vector and a character embedding vector.

15. The CRM of claim 9, wherein the first transcript is an earnings call transcript, wherein the earnings call transcript comprises information to help a stakeholder about making a long-term decision.

16. The CRM of claims 15, wherein the information comprises at least one selected from a group consisting of a question and answer section specifying a communication between an analyst person and an executive person regarding the organization's performance, a type of an event, a first identifier of the stakeholder, a second identifier of the analyst person, a timestamp encoding a date and time of an earnings call, a third identifier of the organization, and a health status of a product.

17. A system comprising:

a client;

a database; and an infrastructure node, wherein the infrastructure node, the client, and the database are connected over a network, wherein the infrastructure node comprises a memory and a processor coupled to the memory, wherein the processor is configured to execute a method for managing an organization's performance, the method comprising:

receiving an adjacency matrix (AM) from a document attention module, wherein the AM is associated with a first graph representation;

obtaining, in response to receiving the AM, an adaptive k-hop learning model;

receiving an output from the adaptive k-hop learning model;

sending the output to a user;

receiving, in response to sending the output, user feedback from the user;

updating the adaptive k-hop learning model based on the user feedback to obtain a trained adaptive k-hop learning model;

determining, by employing the trained adaptive k-hop learning model and in real-time, a first k-hop value for a first transcript and a second k-hop value for a second transcript based on the AM;

analyzing the first k-hop value, the second k-hop value, and the AM to infer:

a relationship between the first transcript and the second transcript, and a second relationship in the AM;

generating, by employing a graph representation learning model, a second graph representation based on the relationship and the second relationship;

transforming the second graph representation into a set of embedding vectors using a set of linear and non-linear machine learning models;

analyzing, by employing a language model, the set of embedding vectors to extract a set of features;

analyzing the set of features to generate a first sentiment score (SS) for a first sentence of the first transcript and a second SS for a second sentence of the first transcript;

classifying the first sentence as a first negative sentence based on the first SS and the second sentence as a second negative sentence based on the second SS;

inferring an average SS of the first transcript based on the first SS and the second SS, wherein, based on the average SS, the first transcript is classified as a negative transcript;

initiating, via a visualizer, displaying of at least the first SS, the second SS, the average SS, and the second graph representation to an administrator; and modifying, by the visualizer and based on the first SS, the second SS, the average SS, and the second graph representation, the first transcript as a speech is being presented with the first transcript.

18. The system of claim 17, wherein the first transcript is an earnings call transcript, wherein the earnings call transcript comprises information to help a stakeholder about making a long-term decision.

19. The system of claims 18, wherein the information comprises at least one selected from a group consisting of a question and answer section specifying a communication between an analyst person and an executive person regarding the organization's performance, a type of an event, a first identifier of the stakeholder, a second identifier of the analyst person, a timestamp encoding a date and time of an earnings call, a third identifier of the organization, and a health status of a product.

20. The system of claim 17, wherein the relationship is inferred based on a neighboring size of a first node to a second node in the first graph representation, wherein the node is associated with the first transcript, wherein the second node is associated with a third transcript, wherein the first k-hop value is used to determine a first interdependency of the first transcript, wherein the second k-hop value is used to determine a second interdependency of the second transcript, and wherein the second relationship is between the second transcript and the third transcript.

* * * * *